(No Model.)
J. E. BOYLE.
FLOAT VALVE OR BALL COCK.
No. 290,204. Patented Dec. 18, 1883.
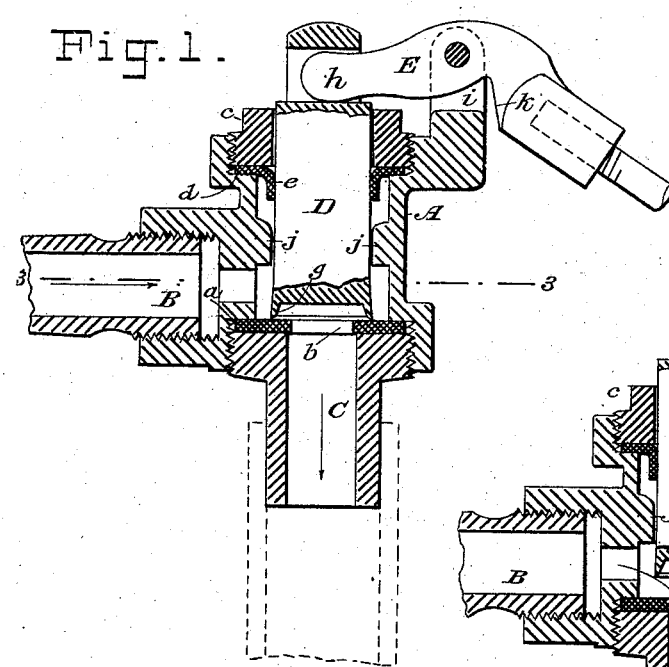
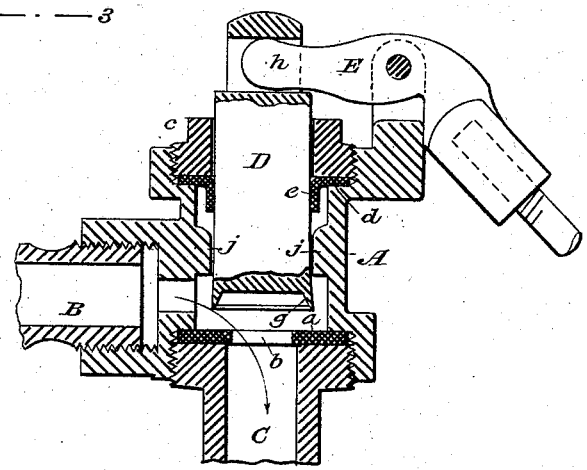
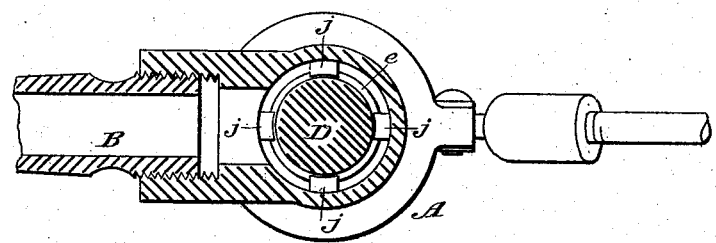
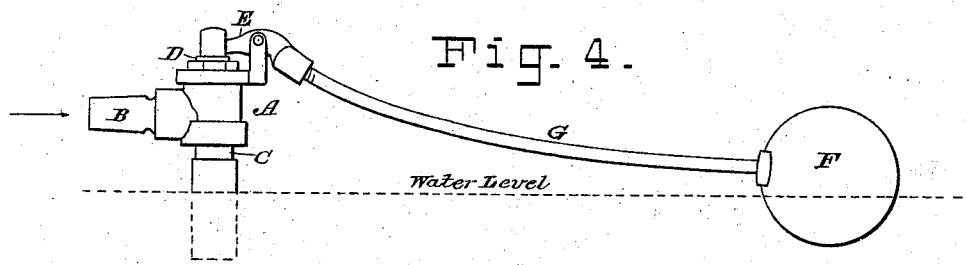
WITNESSES:
INVENTOR:
James E. Boyle
By his Attorneys,

UNITED STATES PATENT OFFICE.

JAMES E. BOYLE, OF BROOKLYN, NEW YORK.

FLOAT-VALVE OR BALL-COCK.

SPECIFICATION forming part of Letters Patent No. 290,204, dated December 18, 1883.

Application filed January 4, 1883. (No model.)

*To all whom it may concern:*

Be it known that I, JAMES E. BOYLE, a citizen of the United States, and a resident of Brooklyn, Kings county, New York, have invented certain Improvements in Float-Valves or Ball-Cocks, of which the following is a specification.

My invention relates to that class of float-valves in which the valve is substantially balanced, the float having to overcome only the friction of the parts in order to close or open the valve.

My valve is adapted especially, but not of course necessarily, to the tanks which supply flush-water to water-closets where there is very little room for the float. Therefore it is necessary to provide a valve that will open and close easily, as there is not room for a large float nor for a small float with a long stem, one or the other of which must be employed if the valve does not operate easily. That class of cocks which employ an oscillating spindle or plug provided with a diametrically-arranged port are apt to leak unless the plug be drawn in tightly, and this produces so much friction as to require a large and heavy float. These cocks also close too gradually to be desirable. In my device I employ a balanced lift-valve, which closes down over the outlet, a very little movement being required to open the valve to its fullest extent.

In the drawings which serve to illustrate my invention, Figure 1 is a vertical mid-section of the valve, taken through the axis of the inlet, and showing the valve closed down upon its seat. Fig. 2 is a similar view, showing the valve raised off its seat. Fig. 3 is a horizontal section taken through the axis of the inlet, (line 3 3, Fig. 1,) and looking upward. Fig. 4 is a side elevation, on a small scale, showing the float attached to the valve.

A is the valve-chamber. B is the inlet at the side, and C is the outlet at the bottom. A shoulder, *a*, is formed in the chamber, and the outlet C screws down upon this, clamping fast a washer, *b*, of rubber, leather, or other similar material, which serves, primarily, as a valve-seat, and, secondarily, for a packing. In the top of the valve-chamber is screwed a ring, *c*, which clamps on a shoulder, *d*, a cupped leather packing, *e*.

D is the valve, which is cylindrical in form, and has a recessed bottom constructed to leave a rather sharp or narrow margin, *g*, to rest upon the valve-seat. The cup-packing *e* embraces the valve, which passes out through the top of the chamber, its outer end being provided with a recess to receive the rounded end *h* of the float-lever E, which is pivoted in a branch, *i*, from the valve-chamber.

The valve is loosely guided in its movements by the projections *j* on the interior face of the valve-chamber.

F is the float, and G the float-stem, which connects it with the lever E. The lever is provided with a shoulder, *k*, which limits the fall of the float and the lift of the valve. When the water stands at the level indicated in Fig. 4, the valve D is depressed and rests on the seat *b*, as in Fig. 1. The water under pressure has free access to the chamber A, and presses the cupped packing *e* closely to the cylindrical body of the valve, thus preventing leakage. The valve is balanced by the pressure of the water, being equal on all sides, and is free to lift as soon as the float F falls. When the water falls below the normal level, the float falls until the shoulder *k* on lever E strikes the branch *i*. This lifts valve D to its full height, as represented in Fig. 2, and the water is free to pass from the inlet to the outlet (see arrows) and thence to the tank. When the water has risen high enough, the float again rises and closes the valve, and this movement is not materially interfered with by the water flowing through. In order, however, to give the valve a little advantage in closing over the opening, I prefer to make the bottom of the valve a little larger than it is at the middle and upper part, and to gradually reduce it to the normal size—that is to say, the lower end of the valve is in the form of a conic frustum, while the remainder is in the form of a cylinder. This is shown in Figs. 1 and 2. By this means I get a slight pressure of the water on the valve, which tends to close it and keep it closed, otherwise the valve is balanced. This enlargement of the lower end of the valve is very slight, indeed so slight as to permit the valve to be readily inserted and drawn out at the top of the chamber through the yielding packing *e*. This facility of removal and replacement enables me to get at the interior of the valve-chamber for the removal of obstructions without the necessity of unscrewing any of the parts, except the removal of the screw which pivots the lever E to the casing. The valve D may also be removed at the bottom by unscrewing the outlet-plug C.

Having thus described my invention, I claim—

1. The combination, to form a float-valve, of the chamber A, provided with shoulders *a* and *d*, and an inlet at the side, the outlet C, arranged to screw into the bottom of said chamber, the valve-seat *b*, the ring *c*, cupped packing *e*, valve D, lever E, stem G, and float F, all arranged to operate substantially as set forth.

2. The valve D of a float-valve, made slightly flaring or conical at its lower end, whereby the pressure of the water in the chamber tends to close it and keep it closed, in combination with the yielding cup-packing *e*, which permits the enlarged part of the valve to pass when the latter is drawn out, substantially as set forth.

In witness whereof I have hereunto signed my name in the presence of two subscribing witnesses.

JAMES E. BOYLE.

Witnesses:
A. ELMONDORF,
ARTHUR C. FRASER.